(12) United States Patent
Hayden et al.

(10) Patent No.: US 8,417,747 B1
(45) Date of Patent: Apr. 9, 2013

(54) VIRTUALLY PROVISIONED VOLUME RECOVERY

(75) Inventors: John M. Hayden, Holliston, MA (US); Xiaoye Jiang, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1445 days.

(21) Appl. No.: 11/427,074

(22) Filed: Jun. 28, 2006

(51) Int. Cl.
*G06F 12/00* (2006.01)
*G06F 17/30* (2006.01)

(52) U.S. Cl.
USPC ......................................................... 707/831

(58) Field of Classification Search .................. 707/831, 707/999.1, 999.202
See application file for complete search history.

(56) References Cited

U.S. PATENT DOCUMENTS

| | | | |
|---|---|---|---|
| 6,389,511 B1* | 5/2002 | Kedem | 711/114 |
| 2003/0009637 A1* | 1/2003 | Arimilli et al. | 711/144 |
| 2005/0223279 A1* | 10/2005 | Malpani et al. | 714/17 |
| 2006/0112242 A1* | 5/2006 | McBride et al. | 711/161 |

* cited by examiner

*Primary Examiner* — Aleksandr Kerzhner
(74) *Attorney, Agent, or Firm* — Anderson Gorecki & Rouille LLP

(57) ABSTRACT

In response to detection of an error in a filesystem file of a virtually provisioned volume or iSCSI LUN host, where the filesystem file is represented in a container filesystem, a Media Sector Error is returned at the virtual volume layer or the virtual iSCSI layer. The error may be a file allocation correction because of a shared block detected by a filesystem check of the container filesystem. The container may flag the shared block to prompt return of the Media Sector Error in response to attempted access of the block by the host. The host is operative to process the Media Sector Error like a storage subsystem Read Media Error, such that the flagged block is overwritten by the host to clear the error.

22 Claims, 5 Drawing Sheets

VIRTUALLY PROVISIONED VOLUME RECOVERY

FIELD OF THE INVENTION

This invention is generally related to the field of data storage, and more particularly to data storage including virtually provisioned volumes which are accessible via a network.

BACKGROUND OF THE INVENTION

Computing and storage devices are widely used business tools. Interfaces for providing access between computing and storage devices include Integrated Drive Electronics ("IDE") and Small Computer System Interface ("SCSI"), among others. IDE is designed specifically for storage and the controller electronics are built into the disk drive. Consequently, IDE is a relatively economical option. While somewhat less economical, SCSI has greater capabilities than IDE. The original SCSI was a parallel interface capable of connecting multiple devices to a personal computer across multiple data lines. Further, SCSI device support was not limited to disk drives.

Some basic functionality and terminology of the original SCSI remain in current versions. Each device on a SCSI bus is assigned a unique Logical Unit Number ("LUN") to distinguish between that device and other devices which share the same bus. SCSI devices that request I/O processes are called "initiators." SCSI devices that perform operations requested by initiators are called "targets." Each target can accommodate multiple devices, known as "logical units," each of which is assigned a LUN. Commands that are sent to a SCSI controller identify devices based on their target and LUN.

Traditional IP storage platforms, such as EMC's Celerra platform, provide access to shared filesystems via industry standard Network Attached Storage ("NAS") protocols such as Network File System ("NFS") and Common Internet Filesystem ("CIFS"). NFS is a distributed filesystem which allows a computer to access files over a network. It is just one of many protocols built on the Open Network Computing Remote Procedure Call system ("ONC RPC"). CIFS is a standard remote file-system access protocol for use over the Internet. It enables groups of users to work together and share documents across the Internet or within corporate intranets. CIFS is an open, cross-platform technology based on the native file-sharing protocols built into Microsoft® Windows® and other popular PC operating systems, and supported on various other platforms. In addition to these protocols, many IP storage platforms also provide support for iSCSI targets. iSCSI is a protocol that encapsulates SCSI commands over/in TCP/IP.

When a network storage device implements an iSCSI LUN, a NAS filesystem (CIFS, NFS, etc.), A Fibre Channel LUN, or any other object as a file in another filesystem, significant data loss can be suffered when corruption occurs in the real ("container") filesystem. The virtually provisioned volume resides in a file in the first container filesystem. For instance, on this volume may reside an iSCSI LUN, a FC LUN, a NAS filesystem, etc, and a second filesystem may reside on the virtually provisioned volume, i.e., a filesystem on a Volume on a File. Eventually, loss of consistency of the container filesystem can be expected to be caused by code error, a back-end error, a driver error, or some other reason. In response to detection of the loss of consistency of the container filesystem, a filesystem check ("fsck") is performed to bring it back into consistency. While checking the filesystem, the checking algorithm will change block allocations. When files are found to be sharing blocks in a NAS filesystem, one file is given the block and the other file is truncated at the shared block. This is not generally a problem in a simple NAS filesystem because the corrupted files are reported as such, and the affect of the change only alters the specific files that were corrupted. However, in the case where the corrupted file is a Volume on a File or an iSCSI target, this behavior presents a problem because truncating a 'file' which is actually an iSCSI LUN or the volume of another filesystem causes the data to suddenly appear to the host to be missing without any forewarning. This is a data loss event. Conversely, the file "assigned" the shared block may not be consistent either. This type of data corruption is sometimes referred to as "silent corruption." The typical response of simply 'picking' one of the files that share this block at random to be the block owner is unsatisfactory because of the probability of corrupting the data view of the LUN or virtual volume, even though it may fix the file level consistency.

SUMMARY OF THE INVENTION

In accordance with an embodiment of the invention, apparatus for providing access to data in a network comprises: a host having a filesystem which describes location of data in virtual storage; and a container having a filesystem which describes location of data in at least one physical storage volume, the data including at least one file representative of the host filesystem, the container filesystem including circuitry operative to find a shared block of data associated with the host filesystem file, circuitry operative to modify the container filesystem to eliminate sharing of the block, and circuitry operative to provide an error indication to the host.

In accordance with another embodiment of the invention, a method for facilitating maintenance of data consistency in a network including a host having a filesystem which describes location of data in virtual storage and a container having a filesystem which describes location of data in at least one physical storage volume, the data including at least one file representative of the host filesystem, comprises the steps of: finding a shared block of data associated with the host filesystem file; modifying the container filesystem to eliminate sharing of the block; and providing an error indication to the host.

The main advantage of the invention is that the problem of data loss and silent corruption of the contained objects is reduced or eliminated so that data consistency can be restored. The error indication provided to the host can be a media sector error which is interpreted by the host as a read media error. The read media error is processed like a storage subsystem read media error, such that the shared block is overwritten by the host to clear the error. In other words, the filesystem's resilience to read media errors will repair the filesystem on a file case, and the iSCSI host's resilience to a SCSI read error will repair the host. Consequently, potential data loss is limited to just the affected block, avoiding the regular case of full data loss from truncation and the possibility of silent data corruption caused by assigning an incorrect block to a volume or LUN during fsck.

DETAILED DESCRIPTION

Figure 1:
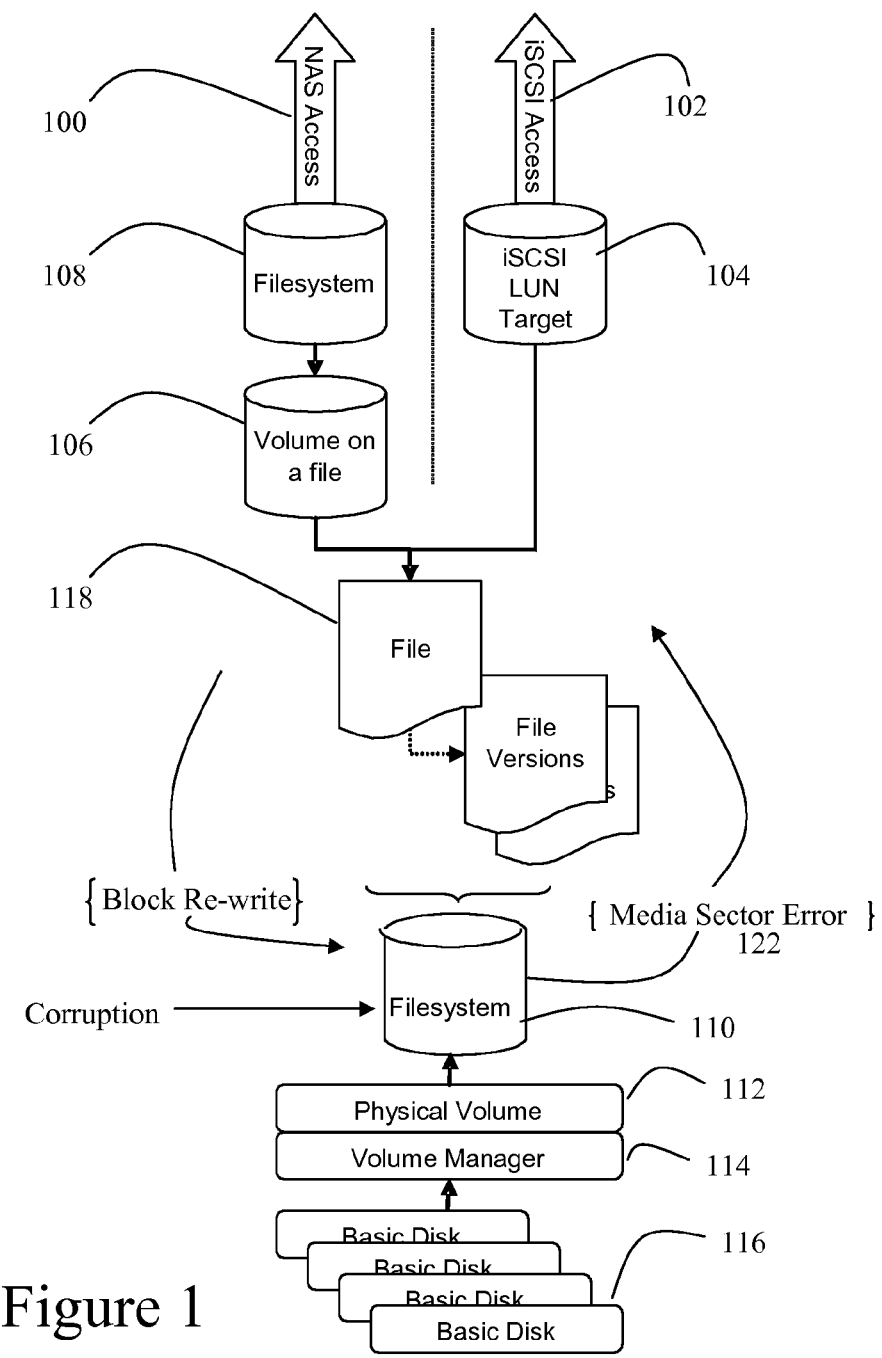
FIG. 1 is a block diagram of a network storage architecture.
Figure 2:
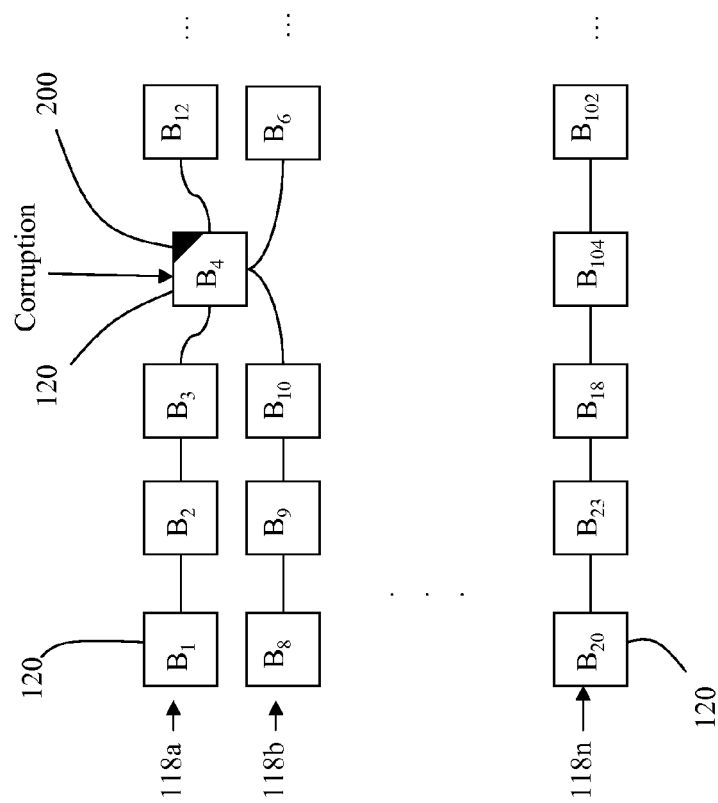
FIG. 2 illustrates an example of file corruption at the block level.

Referring to FIGS. 1 and 2, a network storage architecture provides NAS access (100) and iSCSI access (102). The architecture includes an iSCSI target LUN (104), a Volume on a File (106), a virtual filesystem (108), and a regular ("container") filesystem (110). The container filesystem (110) includes a physical volume (112), a volume manager (114), and an array of basic disks (116). The container filesystem includes a plurality of files (118a-118n). Each file (118a - 118n) includes multiple data blocks (120, individual ones of which are labeled B.). The blocks of a file are not generally contiguous in the disks (116) of the physical volume (112), but must be assembled in a particular order to accurately reproduce the particular file in its entirety. The container filesystem holds control information for the object contained within it such as individual files, i.e., a description of the arrangement of files on data blocks on the volume provided from the volume manager (114). The data blocks hold data, i.e., the information of which the files are comprised. The basic disks (116) are physical storage media, such as disk drives. Neither the iSCSI LUN (104) nor the Volume on a File (106) are physical devices. Rather, they are virtual devices.

At least one of the files described by the container filesystem (110) is the Volume on a File (106) or some other file object presented to clients as an iSCSI LUN or FC LUN. This Volume on a File could also be a volume on which another NAS filesystem is placed. As discussed above, this additional level of abstraction complicates maintenance of data consistency. In order to mitigate problems caused by this additional abstraction, the iSCSI LUN and Virtual Volume (collectively, "hosts") are handled as if they were physical devices for purposes of restoring container filesystem consistency. In the illustrated example, a loss of consistency of the container filesystem is caused by a shared block. A shared block (120, $B_A$) is a single block which because of corruption erroneously belongs to at least two different files (118a, 118b) according to the container filesystem (110). For clarity, this is an error case of a shared block, rather than a valid shared block. In response to detection of the loss of consistency of the container filesystem, a filesystem check ("fsck") is performed on the container filesystem to bring it back into consistency. The logic which performs the fsck is operable to modify the files (118a, 118b) found to be in error. In particular, the logic is operative to eliminate the share condition and set a special flag (200) for all affected blocks found to be in error. This special flag prompts return of a media sector error (122) to the host when access is attempted. The media sector error is interpreted by the host or uplevel application stack as a read media error. The read media error is processed like a storage subsystem read media error, such that the flagged block (120, $B_A$) is overwritten by the host to clear the error.

Figure 3:
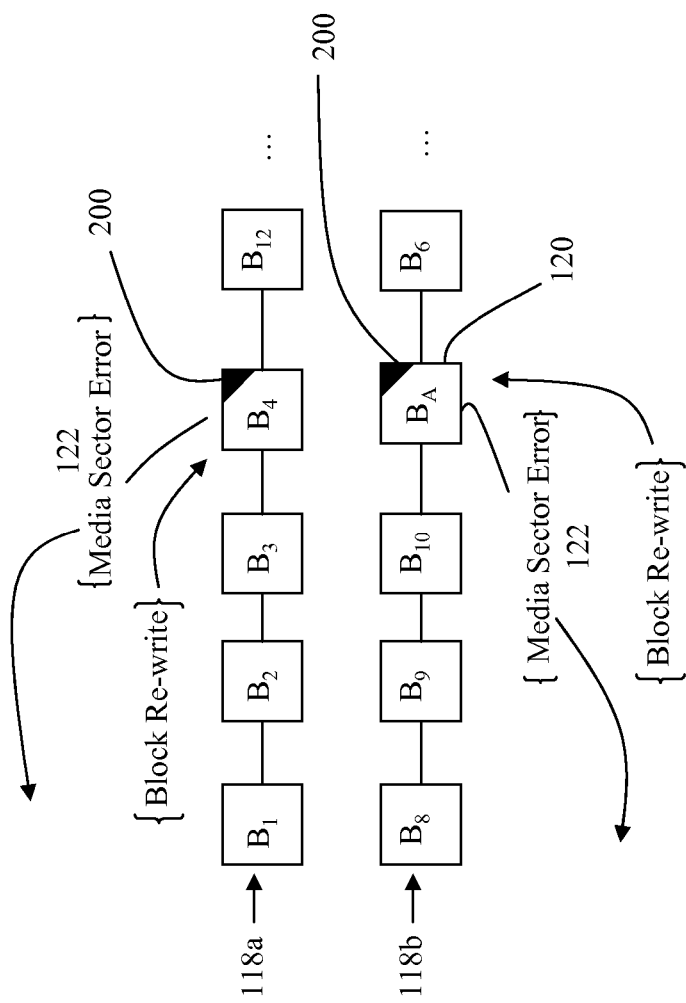
FIGS. 3, 4, and 5 illustrate, at the block level, alternative techniques for responding to detection of file corruption.
Figure 4:
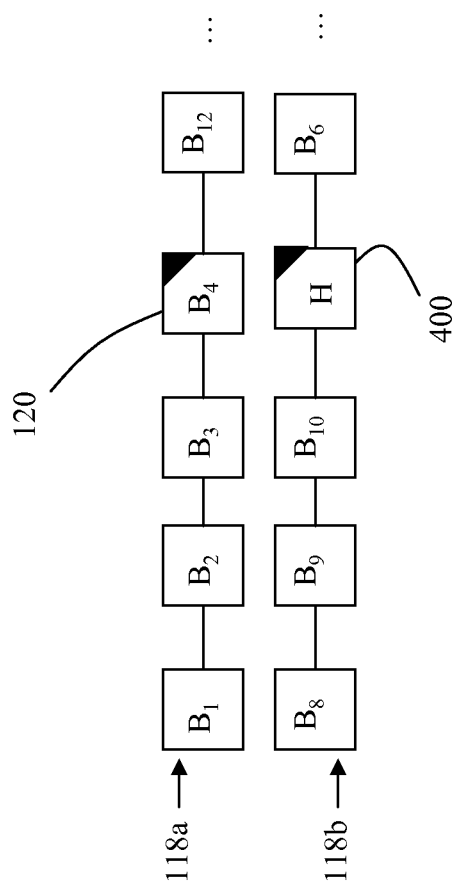
Figure 5:
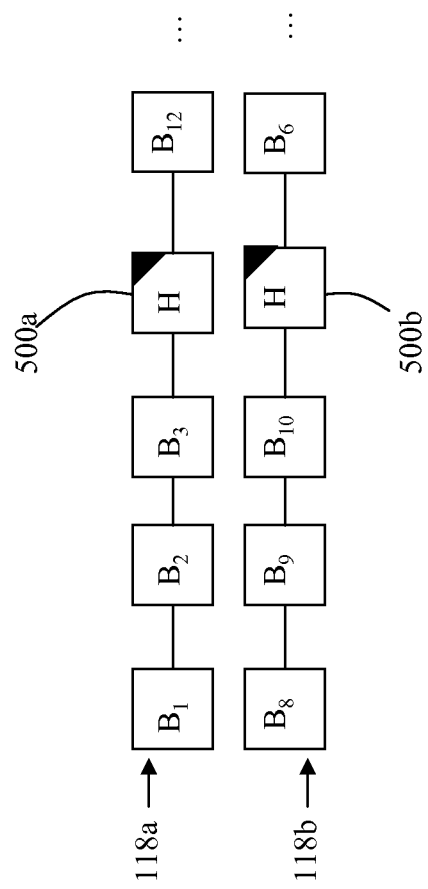

Referring now to FIGS. 3 through 5, in one embodiment a new block (120, $B_A$) is allocated to the truncated file (118b) at the shared block location. The newly allocated block (120, BA) has a special flag (200) set to prompt block rewrite by the host. In the example illustrated in FIG. 3, both the formerly shared block (120, $B_A$) and the newly allocated block (120, $B_A$) contain a copy of the data found in the formerly shared block. Alternatively, the blocks could be emptied of data. As shown in FIG. 4, rather than allocate a new block to one of the files the logic may insert a hole (400), i.e., a null pointer, in place of the shared block. As shown in FIG. 5, both files may alternatively have the formerly shared block replaced with holes (500a, 500b).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A computer program stored on a computer-readable medium for providing access to data in a network, comprising:
    a host having a filesystem which describes location of data in virtual storage; and
    a container having a filesystem which describes location of data in at least one physical storage volume, the data including at least one file representative of the host filesystem, the container filesystem including circuitry operative to find an erroneous shared block of data associated with the host filesystem file, circuitry operative to modify the container filesystem to eliminate sharing of the erroneous block, and circuitry operative to provide an error indication to the host.

2. The computer program of claim 1 wherein the host includes circuitry operative in response to the error indication to rewrite the block.

3. The computer program of claim 2 wherein the error indication is a Media Sector Error.

4. The computer program of claim 3 wherein the Media Sector Error is provided to the host in response to attempted access of the block by the host.

5. The computer program of claim 1 wherein the container modification circuitry eliminates sharing of the block.

6. The computer program of claim 3 further including circuitry operative to flag the block.

7. The computer program of claim 6 wherein the host is operative to interpret the Media Sector Error as a Read Media Error.

8. The computer program of claim 6 wherein the host is operative to process the Media Sector Error as a storage subsystem Read Media Error, such that the flagged block is overwritten by the host to clear the error.

9. The computer program of claim 1 wherein a new block is allocated at the shared block location and marked as a Read Media Error.

10. The computer program of claim 9 wherein the newly allocated block contains a copy of the data from the shared block.

11. The computer program of claim 5 wherein a null pointer is inserted in place of the shared block.

12. A method for facilitating maintenance of data consistency in a network including a host having a filesystem which describes location of data in virtual storage and a container having a filesystem which describes location of data in at least one physical storage volume, the data including at least one file representative of the host filesystem, comprising the steps of:
    finding an erroneous shared block of data associated with the host filesystem file;
    modifying the container filesystem to eliminate sharing of the block; and
    providing an error indication to the host.

13. The method of claim 12 including the further step of rewriting the block in response to the error indication.

14. The method of claim 13 wherein the error indication is a Media Sector Error.

15. The method of claim 14 including the further step of providing the Media Sector Error to the host in response to attempted access of the block by the host.

16. The method of claim 12 including the further step of eliminating sharing of the block.

17. The method of claim 14 further including the step of flagging the block.

18. The method of claim 17 including the further step of interpreting, by the host, the Media Sector Error as a Read Media Error.

19. The method of claim 17 including the further step of processing, by the host, the Media Sector Error as a storage subsystem Read Media Error, and overwriting the flagged block to clear the error.

20. The method of claim 12 including the further step of allocating a new block to the filesystem file at the shared block location and marking it as Read Media Error.

21. The method of claim 20 including the further step of inserting a copy of the data from the shared block into the newly allocated block.

22. The method of claim 16 including the further step of inserting a null pointer in place of the shared block.

* * * * *